United States Patent
Manzar et al.

(10) Patent No.: US 10,125,600 B2
(45) Date of Patent: Nov. 13, 2018

(54) SYSTEM AND METHOD FOR SENSING FLUIDS DOWNHOLE

(71) Applicant: Baker Hughes Incorporated, Houston, TX (US)

(72) Inventors: Muhammad A. Manzar, Spring, TX (US); David M. Chace, Houston, TX (US); Datong Sun, Kingwood, TX (US)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 231 days.

(21) Appl. No.: 14/732,192

(22) Filed: Jun. 5, 2015

(65) Prior Publication Data

US 2016/0356154 A1    Dec. 8, 2016

(51) Int. Cl.
| | | |
|---|---|---|
| E21B 47/10 | (2012.01) | |
| E21B 49/08 | (2006.01) | |
| E21B 49/10 | (2006.01) | |
| G01F 1/10 | (2006.01) | |

(52) U.S. Cl.
CPC .............. *E21B 47/10* (2013.01); *E21B 49/08* (2013.01); *E21B 49/10* (2013.01); *G01F 1/10* (2013.01)

(58) Field of Classification Search
None
See application file for complete search history.

(56) References Cited

U.S. PATENT DOCUMENTS

| | | | | | |
|---|---|---|---|---|---|
| 2,415,636 | A | * | 2/1947 | Johnson | E21B 17/1021 324/323 |
| 2,649,711 | A | * | 8/1953 | Dale | E21B 47/10 166/202 |
| 3,113,455 | A | * | 12/1963 | Sloan | E21B 47/10 250/268 |
| 3,254,710 | A | | 6/1966 | Jensen | |
| 3,258,963 | A | * | 7/1966 | Bryant | E21B 47/1015 73/152.35 |
| 3,352,361 | A | | 11/1967 | Urbanosky | |
| 3,411,587 | A | | 11/1968 | Bournazel | |
| 3,792,347 | A | * | 2/1974 | Hawley | E21B 47/102 324/427 |

(Continued)

OTHER PUBLICATIONS

NPL-GE—Swift Accurate Measurement—GE—2009—Reference Notes—p. 8.

(Continued)

*Primary Examiner* — Jill Culler
(74) *Attorney, Agent, or Firm* — Bracewell LLP; Keith R. Derrington; Linda L. Morgan (57) ABSTRACT

A system and method of sensing fluid in a wellbore, where fluid along a range of radial locations in the wellbore is diverted along a flow path that runs adjacent a fluid sensor. Diverting the fluid from the range of radial locations provides a representative sample of the fluid flowing in the wellbore. Further, the diverted fluid forms a continuous volumetric flow past the fluid sensor to avoid fluid stagnation adjacent the fluid sensor. Diverting the fluid flow can be accomplished by elongate diverter wings attached at discrete circumferential locations around an outer surface of a fluid sensor and that project at oblique angles to the direction of flow. Elongate members can be used for diverting flow, where the distal ends of the elongate members attach to a downhole tool, and vane members span across selected adjacent members for directing flow to the sensor.

16 Claims, 7 Drawing Sheets

(56) References Cited

U.S. PATENT DOCUMENTS

| | | | |
|---|---|---|---|
| 3,826,133 A | 7/1974 | Nicolas et al. | |
| 4,441,362 A * | 4/1984 | Carlson | E21B 47/102 |
| | | | 73/152.31 |
| 4,535,843 A | 8/1985 | Jageler | |
| 4,566,317 A | 1/1986 | Shakra | |
| 4,800,752 A * | 1/1989 | Piers | G01F 5/00 |
| | | | 166/106 |
| 4,893,505 A | 1/1990 | Marsden et al. | |
| 4,962,665 A | 10/1990 | Savage et al. | |
| 5,241,869 A | 9/1993 | Czernichow | |
| 5,251,479 A | 10/1993 | Siegfried et al. | |
| 5,661,237 A * | 8/1997 | Dussan V. | E21B 47/102 |
| | | | 324/324 |
| 6,157,893 A | 12/2000 | Berger et al. | |
| 7,195,063 B2 | 3/2007 | Nogueira et al. | |
| 7,509,855 B2 | 3/2009 | Garvin | |
| 7,596,995 B2 | 10/2009 | Irani et al. | |
| 7,665,519 B2 * | 2/2010 | Oddie | E21B 49/08 |
| | | | 166/162 |
| 7,975,541 B2 * | 7/2011 | Large | E21B 17/1021 |
| | | | 166/241.5 |
| 8,613,315 B2 * | 12/2013 | Shako | E21B 49/08 |
| | | | 166/241.6 |
| 8,646,327 B2 | 2/2014 | Wootten | |
| 8,770,286 B2 | 7/2014 | Briquet et al. | |
| 8,919,209 B2 | 12/2014 | Furlong | |
| 2011/0040501 A1 | 2/2011 | Martin et al. | |
| 2014/0238667 A1 | 8/2014 | Dumont et al. | |

OTHER PUBLICATIONS

NPL—Middle East Well Evaluation Review—New Power in Production Logging—Middle East Well Evaluation Review—Nov. 19, 1997—Reference Notes—p. 4.

International Search Report and Written Opinion for International Application No. PCT/US2016/035850; International Filing Date Jun. 3, 2016; dated Sep. 1, 2016; pp. 1-13.

* cited by examiner

SYSTEM AND METHOD FOR SENSING FLUIDS DOWNHOLE

BACKGROUND OF THE INVENTION

1. Field of Invention

The present disclosure relates to a method and system of sensing fluid downhole, and more specifically, relates to a method and system of diverting a continuous stream of wellbore fluid past the sensor.

2. Description of Prior Art

Downhole sensors are often used for sensing properties in a flow of fluid produced from hydrocarbon producing wellbores. The sensors may be deployed downhole within a producing wellbore, a jumper or caisson used in conjunction with a subsea wellbore, or a production transmission line used in distributing the produced fluids. Monitoring fluid produced from a wellbore is useful in wellbore evaluation and to project production life of a well. In some instances transmission lines may include fluid produced from wells having different owners.

The produced fluid may include water and/or gas mixed with liquid hydrocarbon. Knowing the water fraction is desirable to ensure adequate means are available for separating the water from the produced fluid. Additionally, the amount and presence of gas is another indicator of wellbore performance, and vapor mass flow impacts transmission requirements. Fluid sensors can be employed that provide information regarding total flow, water cut amount, and gas fractions. However, in some flow conditions a single phase (e.g. oil or water) of the wellbore fluid flowing past the sensor can remain adjacent the sensor, so that the measurements taken by the sensor do not fully represent the fluid flowing in the wellbore. Moreover, when in a deviated or horizontal portion of a wellbore, multi-phase fluids can stratify so that sampling fluid in one axial location of the wellbore may not accurately represent the entire volume of fluid flowing in the wellbore.

SUMMARY OF THE INVENTION

Disclosed herein is an example of a downhole tool for monitoring fluid in a wellbore and which includes a housing, a fluid sensor in the housing, and a fluid diverter having a surface that extends along a path that intersects the fluid sensor and which extends along a portion of a circumference of the housing. The fluid diverter can include an elongate member oriented generally oblique to an axis of the housing. The downhole tool can further include additional fluid diverters that are spaced around the circumference of the housing, wherein the additional fluid diverters have surfaces that extend along paths that intersect with the fluid sensor. In this example, the fluid diverters project radially outward into an annular space circumscribing the housing and at angularly spaced locations from one another, so that when a volume of fluid flows in the annular space, a representative portion of the volume of fluid is diverted to the fluid sensor by the fluid diverters. In one example, further included are elongate spring members having ends that couple wife the housing, and wherein the fluid diverter mounts between the spring members. Optionally, the sensor is disposed in a cavity within the housing. In this example, an inlet is formed through a side of the housing and adjacent a downstream end of fee fluid diverter, and wherein an outlet is formed through a side of the housing on an end of the cavity distal from the inlet. Further in this example, the fluid sensor is optionally disposed proximate the outlet. A strainer can be included in the cavity and upstream of the fluid sensor.

Also disclosed herein is an example of a downhole tool for monitoring fluid in a wellbore and which includes a housing having a sidewall, an inlet formed in the sidewall, and an outlet formed in the sidewall and spaced axially away from the inlet, a cavity in the housing in communication with the inlet and the outlet, a fluid sensor in the cavity disposed proximate the outlet, a planar fluid diverter having an upstream end spaced radially outward from the housing, a downstream end disposed proximate the inlet, and a diverter surface that faces the housing, so that when the downhole tool is disposed in the wellbore and a volume of wellbore fluid flows past the housing, at least some of the volume of wellbore fluid flows along the diverter surface and to the fluid sensor. Elongate spring members can be included and that have ends coupled to the housing at axially spaced apart locations, and wherein lateral sides of the fluid diverter mount to the spring members. Additional fluid diverters can be included that each have an upstream end spaced radially outward from the housing, a downstream end disposed proximate the inlet, and a diverter surface facing the housing, so that when the downhole tool is disposed in the wellbore and a volume of wellbore fluid flows past the housing, at least some of the volume of wellbore fluid flows along the diverter surface and to the fluid sensor, and wherein the fluid diverters are angularly spaced around the housing so that the fluid being diverted to the fluid sensor is representative of the volume of fluid flowing in the wellbore. The upstream end of the fluid diverter can be disposed adjacent an outer radius of an annulus that circumscribes the housing.

A method of sampling fluid within a wellbore is disclosed herein and that includes disposing a fluid sensor in the wellbore and in the path of a volume of flowing fluid, diverting an amount of the volume of flowing fluid to the fluid sensor from a space that extends along a portion of the circumference of the wellbore, and sensing the amount of the volume of the flowing fluid with the fluid sensor. The amount of the volume of the flowing fluid can be representative of the entire cross section of fluid flowing in the wellbore. The sensor can be provided in a cavity of a downhole tool, and the method can further include directing the amount of the volume of the flowing fluid to an inlet on the downhole tool that is in fluid communication with the cavity and the fluid sensor. In an alternative, the amount of the volume of the flowing fluid is taken at multiple locations in the wellbore and that are angularly spaced apart from one another. The fluid sensor can be disposed in a horizontal portion of the wellbore.

BRIEF DESCRIPTION OF DRAWINGS

Some of the features and benefits of the present invention having been stated, others will become apparent as the description proceeds when taken in conjunction with the accompanying drawings, in which.

While the invention will be described in connection with the preferred embodiments, it will be understood that it is not intended to limit the invention to that embodiment. On the contrary, it is intended to cover all alternatives, modifications, and equivalents, as may be included within the spirit and scope of the invention as defined by the appended claims.

DETAILED DESCRIPTION OF INVENTION

The method and system of the present disclosure will now be described more fully hereinafter with reference to the accompanying drawings in which embodiments are shown. The method and system of the present disclosure may be in many different forms and should not be construed as limited to the illustrated embodiments set forth herein; rather, these embodiments are provided so that this disclosure will be thorough and complete, and will fully convey its scope to those skilled in the art. Like numbers refer to like elements throughout. In an embodiment, usage of the term "about" includes +/−5% of the cited magnitude. In an embodiment, usage of the term "substantially" includes +/−5% of the cited magnitude.

It is to be further understood that the scope of the present disclosure is not limited to the exact details of construction, operation, exact materials, or embodiments shown and described, as modifications and equivalents will be apparent to one skilled in the art. In the drawings and specification, there have been disclosed illustrative embodiments and, although specific terms are employed, they are used in a generic and descriptive sense only and not for the purpose of limitation.

Figure 1:
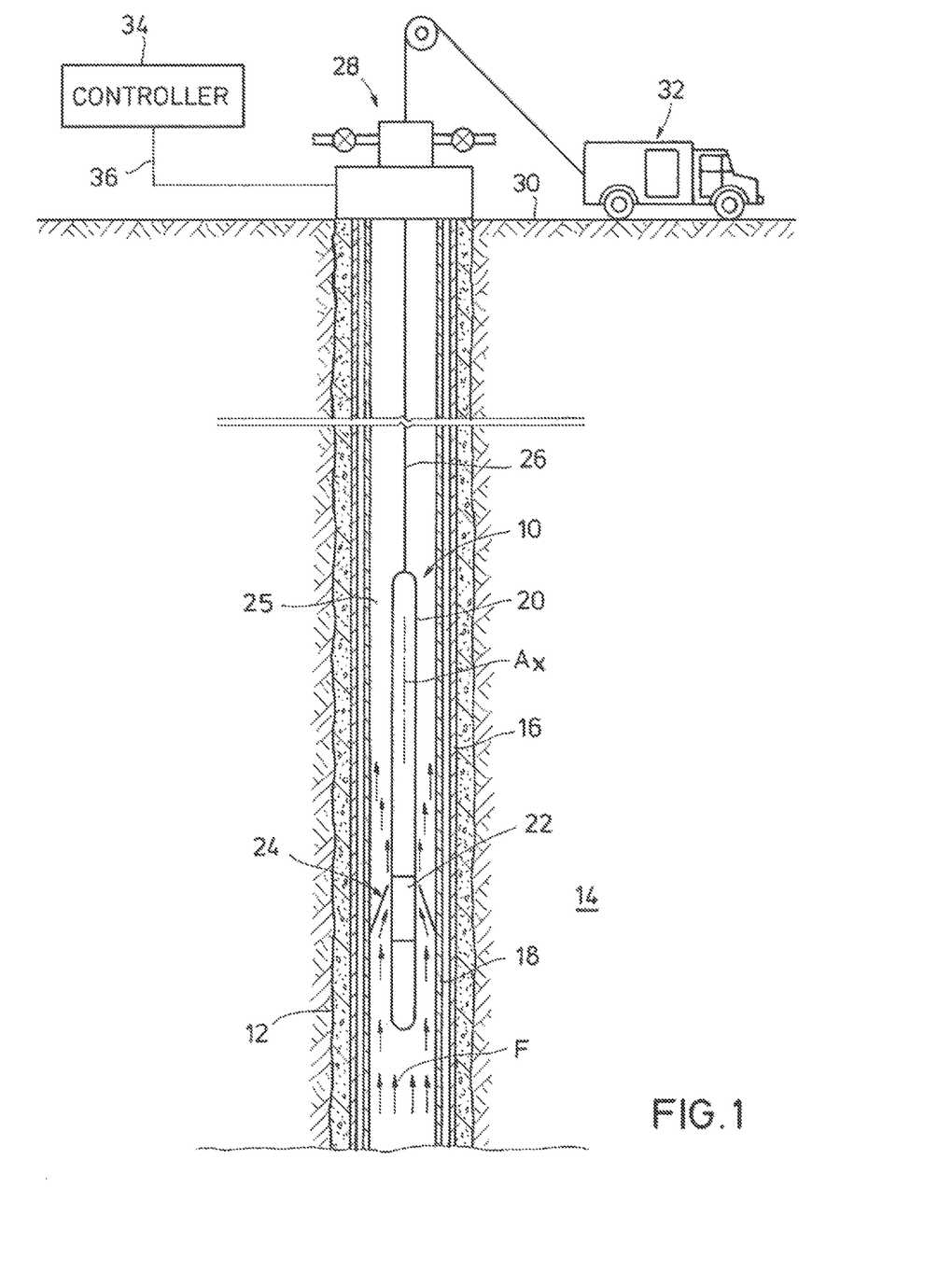
FIG. 1 is a side sectional view of art example of a downhole tool for sensing fluid flowing in a wellbore.

FIG. 1 shows in a side sectional view one example of a downhole tool 10 that is disposed in a wellbore 12, which as illustrated intersects a formation 14. In the example, a string of casing 16 lines the wellbore 12 which selectively isolates portions of formation 14 from wellbore 12. In the example of FIG. 1, an optional string of tubing 18 is shown inserted within casing 16 and which circumscribes downhole tool 10. Downhole tool 10 is shown made up of an elongate housing 20 and in which is disposed a fluid sensing unit 22. Fluid produced from formation 14 enters into tubing 18, and flows upward within tubing 18, where it can be sensed by fluid sensing unit 22. Examples of fluid sensing unit 22 include flow meters, tuning forks, capacitance type, and radioactive. Shown coupled on the outer surface of housing 20 is a flow diverter 24, which as illustrated extends into an annulus 25 that is defined between housing 20 and tubing 18. As illustrated by arrows, a flow of fluid F makes its way up tubing 18, enters annulus 25, and then is directed radially inward against housing 20 by flow diverter 24. An advantage of diverting flow to the fluid sensing unit 22 is that the flow velocity of fluid F is increased when passing by sensing unit 22, thereby eliminating the possibility of fluid stagnation. Because the fluid properties may change over time with the fluid F flowing over the sensing unit 22, it is important that no fluids linger proximate the fluid sensing unit 22 that may give results that are not fully representative of the fluid F within wellbore 12. Examples of a representative sample include a fluid sample having properties that reflect the flow of fluid F within tubing 18 as a whole, and not skewed by fluid that may concentrate in one portion or zone of tubing 18 and have properties that differ from the overall flow of fluid F.

In the embodiment of FIG. 1, downhole tool 10 is shown supported by a wireline 26 which threads through a wellhead assembly 28 shown at the opening of the wellbore 12 and at surface 30. An end of wireline 26 opposite from its attachment to downhole tool 10 extends into a surface truck 32 shown on surface 30. Operation and control of downhole tool 10 within wellbore 12 may take place within surface truck as well as the recording of any data sensed by downhole tool 10 within wellbore 12. Alternatively, a controller 34 separate from surface truck 32, may be included and which communicates with downhole tool 10 via a communication means 36. Controller 34 can be on surface 30 or remote from wellbore 12. Example communication means 36 include hard wire, fiber optics, telemetry, combinations thereof, and the like.

Figure 2:
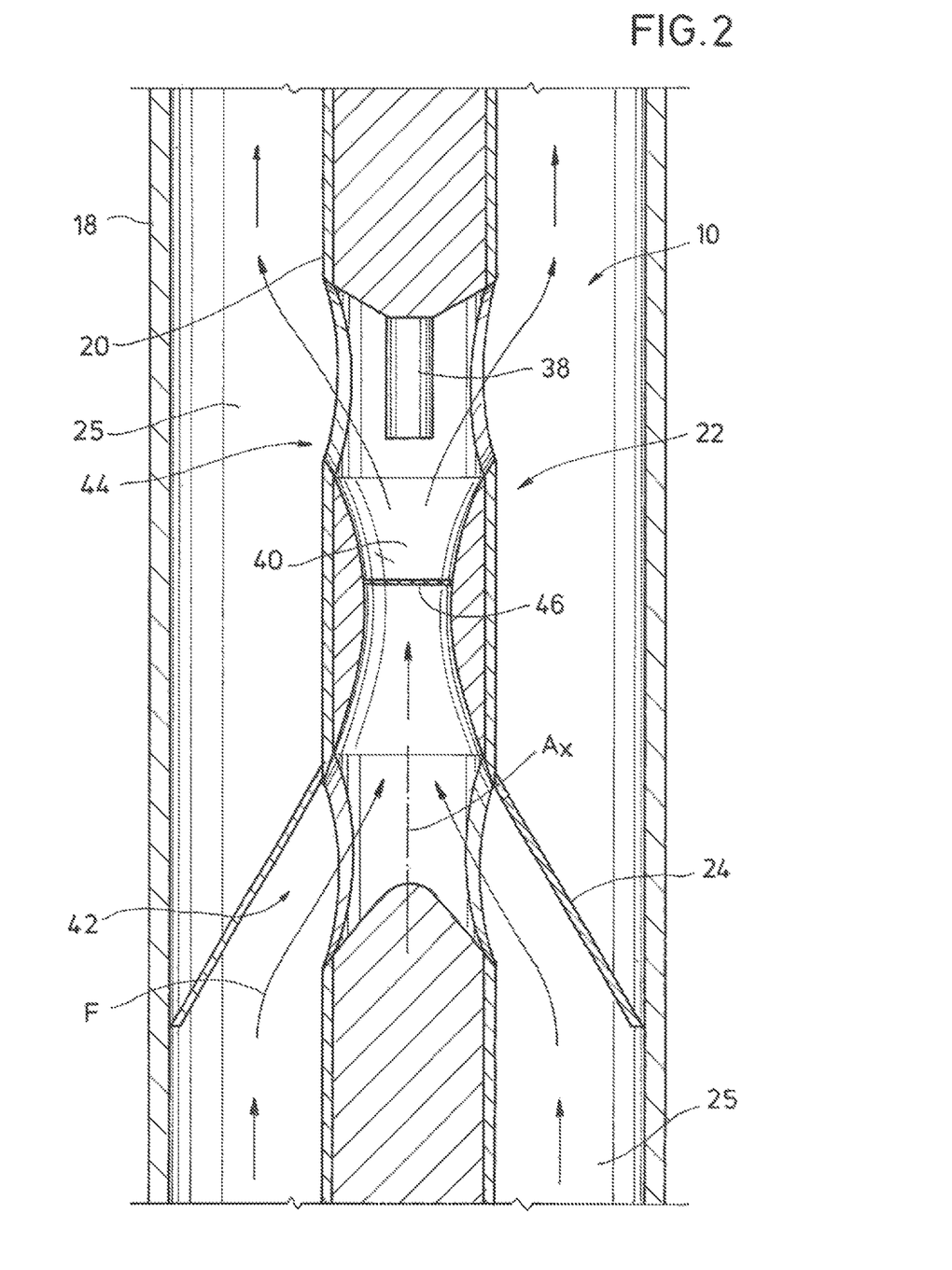
FIG. 2 is a side sectional view of an example of fluid flowing past an example of a fluid sensor in the downhole tool of FIG. 1.

Referring now to FIG. 2, a portion of downhole tool 10 is shown in a side sectional view. In this example, fluid sensing unit 22 is shown equipped with a sensor element 38 that is disposed within a cavity 40; where cavity 40 is formed within housing 20. An inlet 42 is formed through a sidewall of housing 20 that is in fluid communication with cavity so that the flow of fluid F within annulus 25 may flow into housing 20 via inlet 42, through cavity 40, and into contact with sensor element 38. Providing fluid at or proximate to sensor element 38 allows sensor element 38 to monitor intonation about the fluid. Examples of information may include fluid composition, fluid density, fluid viscosity, fluid pressure, fluid temperature, water, gas, and oil percentage (i.e. fluid, phase holdup). Adjacent sensor element 38 is an exit 44 shown through a sidewall of housing 20. Accordingly, a flow path of fluid F can make its way along a surface of flow diverter 24 into cavity 40 via inlet 42, and exit cavity 40 through outlet 44 and return into annulus 25 and continue flowing uphole. In the example of FIG. 2, a downstream end of flow diverter 24 connects proximate the inlet 42. In the illustrated embodiment the flow diverter 24 can be an elongate element and which is disposed at an angle oblique to an axis $A_X$ of the housing 20. In one example, the flow diverter 24 is made up of a number of elongate planar elements. Further, the upstream ends of the elements may project proximate to an outer radius of annulus 25 and adjacent to or in contact with an inner surface of tubing 18 (or any other tubular in which downhole tool 10 is inserted). Further examples exist wherein the downhole tool 10 is disposed within a wellbore 12 which is sometimes referred to as an open hole, and that is not lined with casing or does not have tubing. In this example, the outer or upstream ends of the flow diverter 24 would be adjacent walls of the wellbore 12 (FIG. 1). Further in the example of FIG. 2, a strainer 46 is shown spanning radially across cavity 40 and is designed to capture particles or other unwanted material and prevent such particles from impending or otherwise coming into contact with sensor element 38. Although shown as a planar element, examples of the strainer 46 include conically shaped elements with its apex directed upstream so that any debris entrained within the flow of fluid F is directed radially outward when it impinges the strainer 46 and is guided out of the primary path of the flow by the conical shape of the strainer 46.

Figure 3:
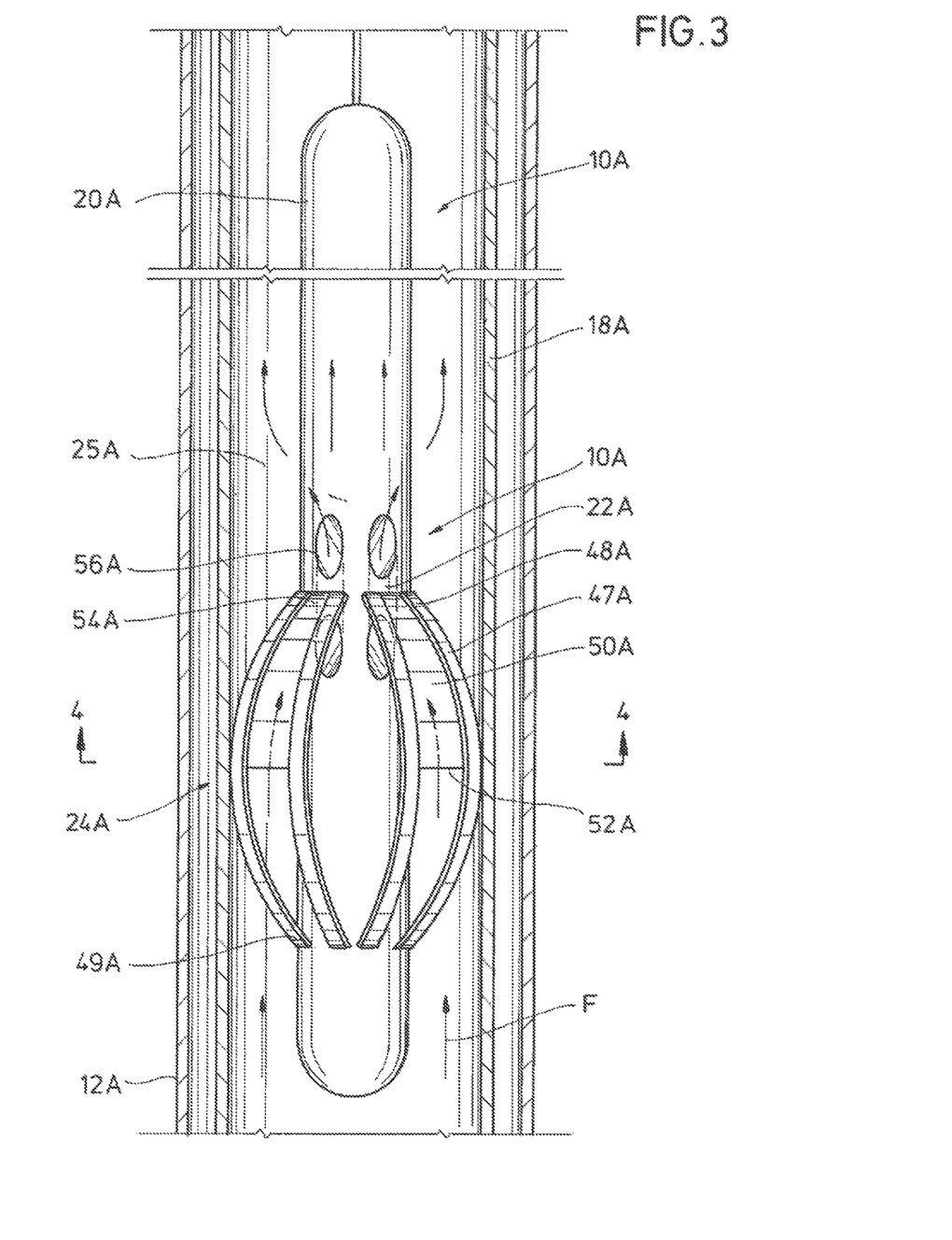
FIG. 3 is a side sectional view of an alternate example of a downhole tool for sensing fluid in a wellbore.

Shown in FIG. 3 is one alternate example of a downhole tool 10A disposed in wellbore 12 and for sensing fluid sampled from a flow of fluid F flowing within wellbore 12. In this example a series of elongate elements 47A are shown having their opposite ends coupled to an outer surface of housing 20A. Here the downstream ends 48A of the elements 47A couple to the housing 20A proximate where the fluid sensing unit 22A is provided within housing 20A. Upstream ends 49A of the elements 47A couple to housing 20A an axial distance upstream from the fluid sensing unit 22A. Examples exist where the elongate elements 47A resemble bow springs that are used typically for measuring devices, or for centralizing tools within wellbores or tubulars. Accordingly, the elongate elements 47A can be flexible and bend when coming into contact with the wall of tubing 18A or other solid surface encountered within wellbore 12A. Vane elements 50A are shown provided between adjacent elongate elements 47A and extending axially from about a midsection of the elements 47A and up to proximate the downstream ends 48A of the elongate elements 47A. As shown, the vane elements 50A have upstream ends 52A that are proximate the outer radial area of annulus 25 (and proximate the midsection of elements 47A), so that the flow of fluid F can impinge upon surfaces of vane elements 50A facing towards housing 20A, and be directed radially inward towards the fluid sensing unit 22A. The portion of the flow of fluid F that is diverted by the flow diverter 24A extends along a path that intersects with fluid sensing unit 22A when flowing along the inner surface of the vane elements 50A. The fluid exits the vane elements 50A al downstream ends 54A of the vane elements 50A. The location and positioning of the vane elements 50A provides for the diverting of fluid at multiple radial locations within annulus 25A, and thus provides the ability to obtain a representative sample of the flow of fluid F flowing within wellbore 12A.

In the example of FIG. 3, multiple vane elements 50A are illustrated disposed at angularly spaced apart locations that circumscribe housing 20A. As will be described in more detail below, this provides an advantage of obtaining a sample that is representative of the flow of fluid F when stratification can occur in the flow of fluid F, such as in a deviated or a horizontal wellbore. In stratified conditions, sampling at a single location in the wellbore will not yield representative results.

Still referring to FIG. 3, optional flow channels 56A are shown formed within housing 20A and proximate the downstream ends 54A of vane elements 50A. The flow channels 56A provide a flow path of the fluid flowing past the upstream end of main elements 50A to enter into housing 20A and flow past a sensing element (not shown) disposed within fluid sensing unit 22A. Although some flow is projected radially inward by interaction with vane element 50A as shown in FIG. 3, the flow F may then expand radially outward when downstream of the flow sensing unit 22A.

Figure 4:
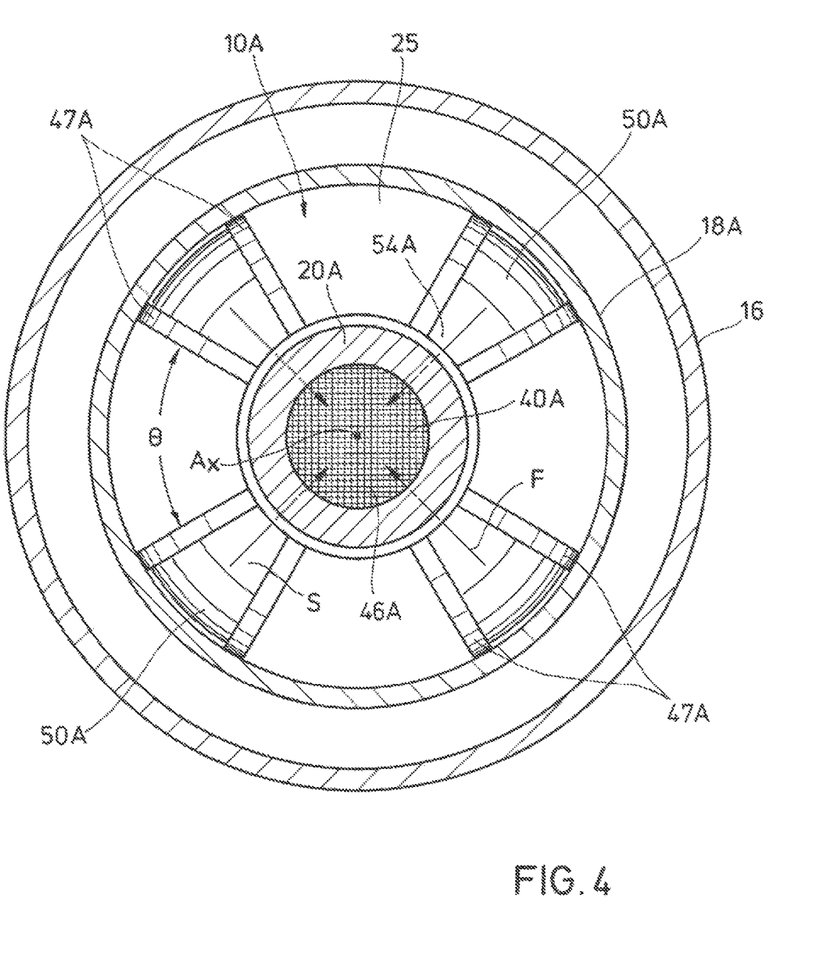
FIG. 4 is an axial sectional view of the downhole tool of FIG. 3 and taken along lines 4-4.

FIG. 4 shows an axial sectional view of the downhole tool 10A of FIG. 3 and taken along lines 4-4. Here, vane elements 50A are shown at equidistant angles Θ, spaced apart from one another and circumscribing access $A_X$ of housing 20. Thus flow along the surface S that laces radially inward on the vane elements 50A can be directed towards the flow sensing unit 22A (FIG. 3) which is downstream of the downstream end 54A of the vane elements 50A. In one example, the surface S extends along the path of the flow of fluid F flowing from within wellbore 12 and on its way to the sensing unit 22A. Optionally, a strainer 46A is shown provided within tool 10A and upstream of fluid sensing unit 22A.

Figure 5:
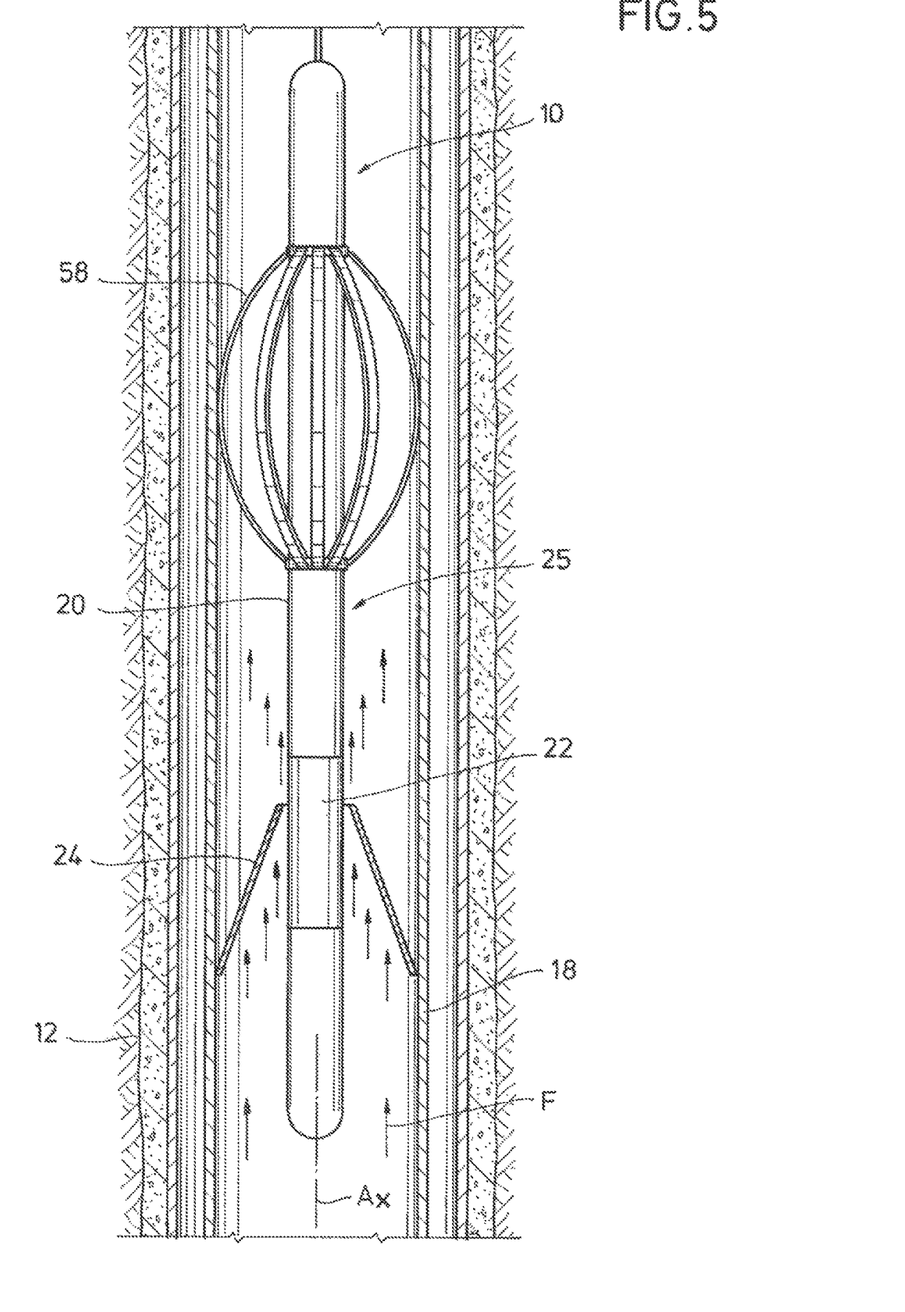
FIG. 5 is a side sectional view of an example of the downhole tool of FIG. 1 in a horizontal portion of the wellbore.

FIG. 5 shows one example of downhole tool 10 in a deviated horizontal portion 54 of wellbore 12. Here, housing 20 is shown roughly coaxial with an axis $A_X$ of wellbore 12 and held in place by optional centralizers 58 that support housing 20 in wellbore 12 and away from walls of the wellbore 12. Thus an annulus 25 remains between the housing 20 and tubing 18. As is known, in horizontal wellbores the flow of fluid F within wellbore 12 may stratify so that portions of fluid in the lower regions of wellbore 12 may contain a higher percentage of water than fluid in an upper region. One of the examples of the selective sampling of fluid at different angular locations within wellbore 12 is the ability to obtain a samples at multiple angular locations about the wellbore 12, that are then mixed, so that a representative sample of fluid from the wellbore is sent towards fluid sensing unit 22, and where the representative sample of fluid has properties and/or characteristics that are the same or substantially similar to an entire cross section of the flow of fluid F flowing in the wellbore 12. In one example, the representative sample of fluid has properties/characteristics that are the same or substantially similar to an average of the properties/characteristics of the cross section of the flow of fluid F flowing the wellbore 12.

An additional advantage of the flow diverter 24 described herein is that unlike some diverters that fully circumscribe a downhole tool, flow diverter 24 provides elongate elements that are at strategic locations angularly spaced around the housing 20. As such, the flow of fluid F can make its way between adjacent ones of the elongate elements making up the flow diverter 24 and significantly reduce overall fluid factional drag across the tool 10. Additionally, the embodiment discussed herein improves wettability characteristics of a tool in the sensor surface which discourages affinitive of different fluid phases. Referring back to FIG. 4, although four different vane elements 50A are shown, the number of vane elements 50A can range from about two to about ten. An advantage of using the bow spring type material is that the tool 10 can be used in tubulars of varying diameters.

Figure 6:
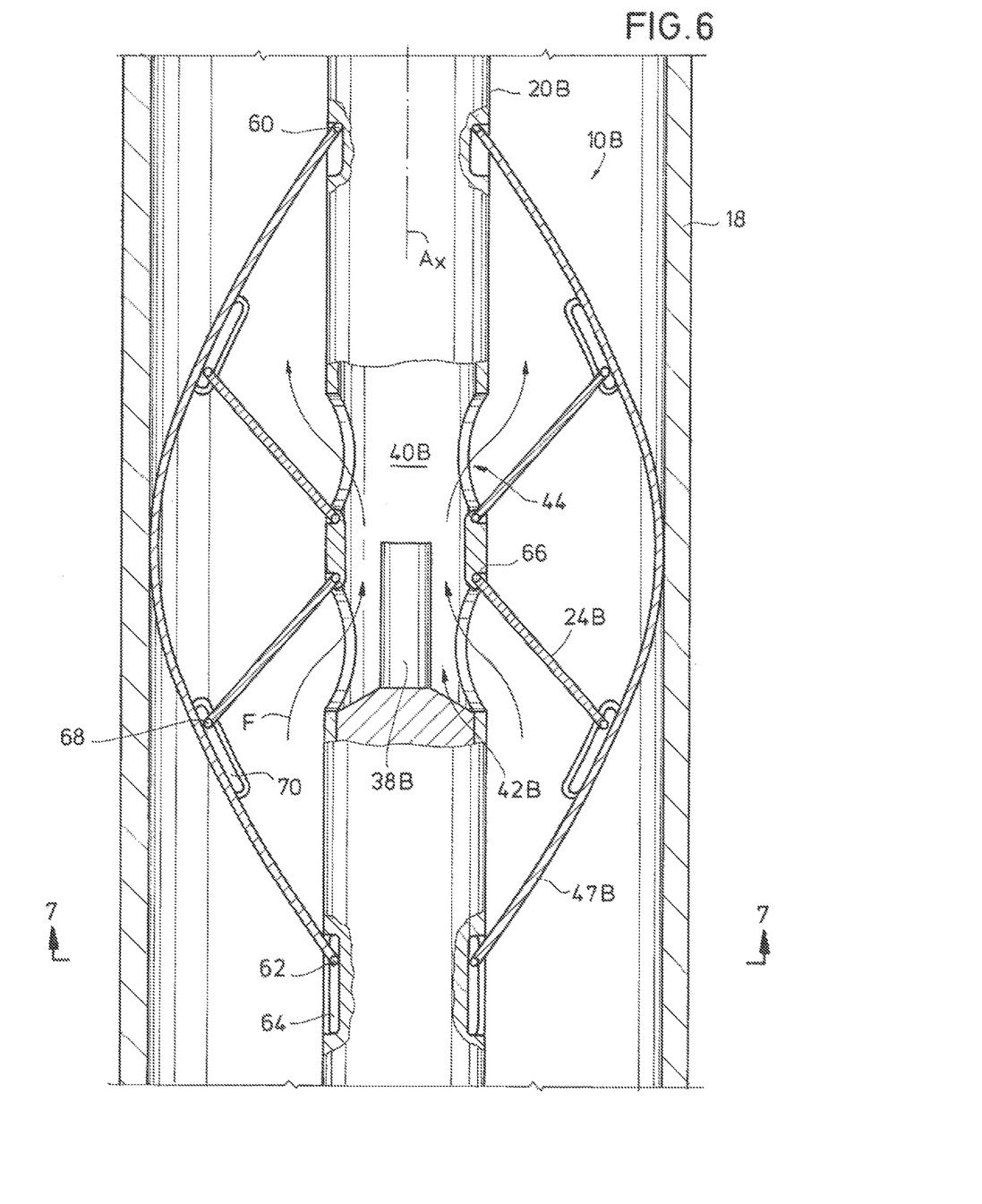
FIG. 6 is a side sectional view of an alternate example of a downhole tool for sensing fluid flowing in a wellbore.

Shown in a side sectional view in FIG. 6 is another alternate example of a downhole tool 10B for sensing fluid flowing within a tubular. Here elongate elements 47B which in an example include bow springs, have ends that pivotingly attached to the housing 20B with pins 60. The opposite ends of the elements are equipped with rods 62 that slidingly fit into slots 64 shown formed into the housing 20B. Thus the downhole tool 10B can be disposed into tubulars having a wide range of diameters, with any change in diameter, the elongate members 47B can pivot about pins 60, while the distal end can slidingly reciprocate within slots 64. Also shown in FIG. 6 are flow diverters 24B that have ends mounted to the housing 20B adjacent both the inlet 42B and outlet 44B. As shown, the configuration of the flow diverters 24B accounts for flow of fluid F in axial directions wherein the fluid flows into cavity 40B via inlet 42B, and from cavity 40B via outlet 44B. Conversely, the direction of fluid flow F can be reversed, so that fluid flows into cavity 40B via the outlet 44B and flows from cavity 40B via inlet 42B. Further in this example, the ends of the flow diverters 24B that mount to housing 20B are equipped with pins 66 so that the flow diverters 24B can pivot and their outer ends move radially inward and outward depending on a diameter of tubing 18. Further, the ends of flow diverters 24B distal from housing 20B have rods 68 that slidingly fit into slots 70 form axially within portions of the elongate members 47B. Thus as the elongate members 47B flex radially inwardly and outwardly, the flow diverters 24B can pivot about their pinned connections to the housing 20B to account for the flexing of the elongate members 47B.

Figure 7:
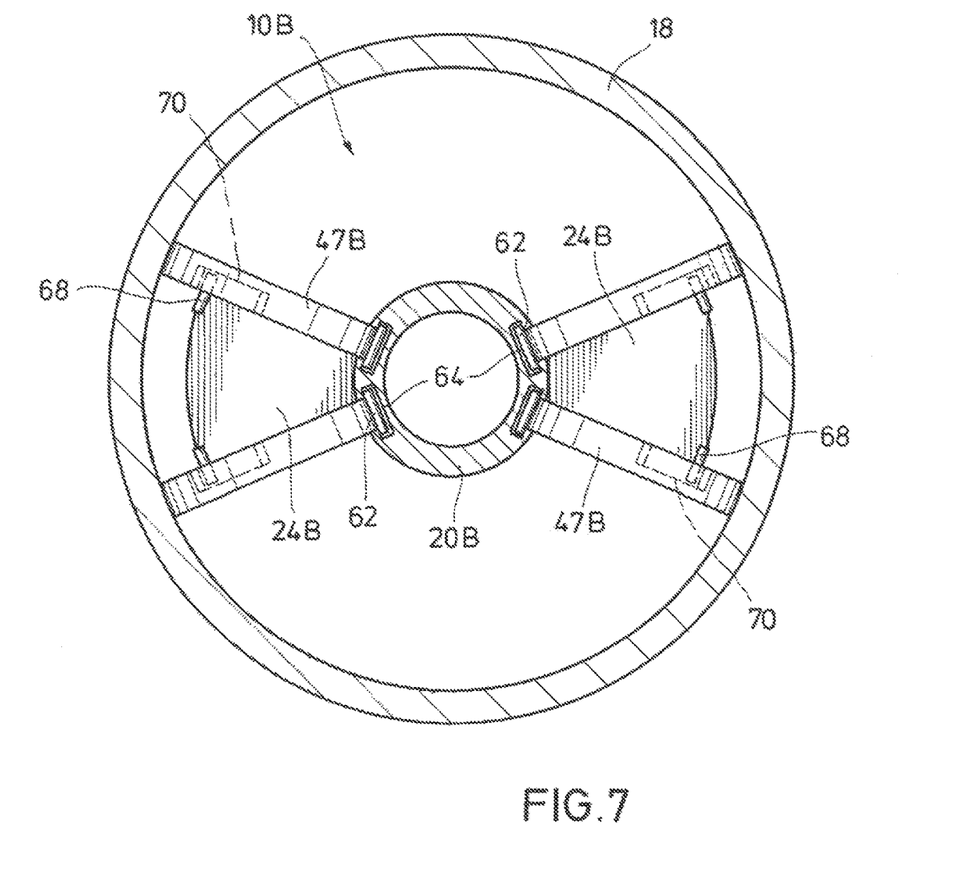
FIG. 7 is an axial sectional view of the downhole tool of FIG. 6 and taken along lines 7-7.

FIG. 7 is an axial sectional view of an example of the downhole tool 10B and taken along lines 7-7 of FIG. 6. Here a pair of flow diverters 24B project radially outward from housing 20B, and at substantially opposing sides of housing 20B. However, alternate embodiments exist wherein more than two flow diverters 24B are provided on housing 20B. Moreover, the flow diverters can be spaced at equidistant angular distances from one another, or staggered and set apart at different angular distances. Shown in dashed outline are slots 70 in the elongate members 47B and in which rods 68 can slidingly move. It should be pointed out that the bi-directional flow feature is not limited to the embodiments of FIGS. 6 and 7, but can be employed to all other embodiments disclosed herein for operation in tubulars where fluid flows in more than one direction.

The present invention described herein, therefore, is well adapted to carry out the objects and attain the ends and advantages mentioned, as well as others inherent therein. While a presently preferred embodiment of the invention has been given for purposes of disclosure, numerous changes exist in the details of procedures for accomplishing the desired results. These and other similar modifications will readily suggest themselves to those skilled in the art, and are intended to be encompassed within the spirit of the present invention disclosed herein and fee scope of the appended claims.

What is claimed is:

1. A downhole tool for monitoring fluid in a wellbore comprising:
   a housing;
   a fluid sensor in the housing;
   elongate spring members having opposing ends that couple with the housing;
   fluid diverters that mount between adjacent spring members and are spaced apart from one another around the circumference of the housing at angularly spaced locations.

2. The downhole tool of claim 1, wherein one of the fluid diverters comprises an elongate member oriented generally oblique to an axis of the housing.

3. The downhole tool of claim 1, wherein the fluid sensor comprises a sensor element that monitors information about the fluid, wherein the information is selected from the group consisting of fluid composition, fluid density, fluid viscosity, fluid pressure, fluid temperature, water, gas, and oil percentage.

4. The downhole tool of claim 1, wherein the sensor is disposed in a cavity within the housing.

5. The downhole tool of claim 4, wherein an inlet is formed through a side of the housing and adjacent a downstream end of the fluid diverter, and wherein an outlet is formed through a side of the housing on an end of the cavity distal from the inlet.

6. The downhole tool of claim 5, wherein the fluid sensor is disposed proximate the outlet.

7. The downhole tool of claim 4, further comprising a strainer in the cavity and upstream of the fluid sensor.

8. A downhole tool for monitoring fluid in a wellbore comprising:
   a housing having a sidewall, inlets formed in the sidewall, and outlets formed in the sidewall that are spaced axially away from the inlets;
   a cavity in the housing in communication with the inlets and the outlets;
   a fluid sensor in the cavity disposed proximate the outlet, and in a path of fluid flowing from the inlets to the outlets;
   elongate elements each having opposing ends coupled to an outer surface of the housing, and each having a mid-portion set radially outward from the housing;
   planar fluid diverter supported between adjacent elongate elements, each diverter having an upstream end spaced radially outward from the housing, a downstream end disposed proximate the inlet, and a diverter surface that faces the housing, so that when the downhole tool is disposed in the wellbore and a volume of wellbore fluid flows in an annulus between the housing and sidewalls of the wellbore, a first portion of the volume of wellbore fluid flows along the diverter surface, into the inlets, and to the fluid sensor, and a second portion of the volume of wellbore fluid flows between adjacent diverters, and past the inlets and the outlets.

9. The downhole tool of claim 8, further comprising elongate spring members having ends coupled to the housing at axially spaced apart locations, and wherein lateral sides of the fluid diverter mount to the spring members.

10. The downhole tool of claim 8, further comprising additional fluid diverters that each have an upstream end spaced radially outward from the housing, a downstream end disposed proximate the inlet, and a diverter surface facing the housing, so that when the downhole tool is disposed in the wellbore and a volume of wellbore fluid flows past the housing, at least some of the volume of wellbore fluid flows along the diverter surface and to the fluid sensor, and wherein the fluid diverters are angularly spaced around the housing so that the fluid being diverted to the fluid sensor is representative of the volume of fluid flowing in the wellbore.

11. The downhole tool of claim 8, wherein the upstream end of the fluid diverter is disposed adjacent an outer radius of an annulus that circumscribes the housing.

12. A method of sampling fluid within a wellbore comprising:
   a. disposing a downhole tool in the wellbore and in the path of a volume of flowing fluid, the downhole tool comprising a housing, a cavity, and a fluid sensor in the cavity;
   b. diverting a portion of the volume of fluid flowing in an annulus outside the housing and radially inward to the cavity and fluid sensor, and allowing a remaining portion of the volume of fluid flowing in the annulus to pass downstream of the cavity; and
   c. sensing the portion of the flowing fluid in the cavity with the fluid sensor.

13. The method of claim 12, wherein the amount of the volume of the flowing fluid is representative of the volume of flowing fluid in the wellbore.

14. The method of claim 12, the method further comprising directing the amount of the volume of the flowing fluid to an inlet on the downhole tool that is in fluid communication with the cavity and the fluid sensor.

15. The method of claim 12, wherein the amount of the volume of the flowing fluid is taken at multiple locations in the wellbore and that are angularly spaced apart from one another.

16. The method of claim 12, wherein the fluid sensor is disposed in a horizontal portion of the wellbore.

* * * * *